(12) United States Patent
Cho

(10) Patent No.: US 11,847,867 B2
(45) Date of Patent: Dec. 19, 2023

(54) ALARM OFFSET OPTIMIZATION APPARATUS OF AUTOSAR OPERATING SYSTEM

(71) Applicant: HYUNDAI AUTOEVER CORP., Seoul (KR)

(72) Inventor: Jun Ho Cho, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 453 days.

(21) Appl. No.: 16/951,744

(22) Filed: Nov. 18, 2020

(65) Prior Publication Data

US 2021/0174606 A1 Jun. 10, 2021

(30) Foreign Application Priority Data

Dec. 9, 2019 (KR) .......................... 10-2019-0162688

(51) Int. Cl.
| | | |
|---|---|---|
| *G06F 11/07* | (2006.01) | |
| *G07C 5/00* | (2006.01) | |
| *G07C 5/08* | (2006.01) | |
| *G06F 11/00* | (2006.01) | |

(52) U.S. Cl.
CPC ............ *G07C 5/008* (2013.01); *G06F 11/004* (2013.01); *G06F 11/008* (2013.01); *G07C 5/085* (2013.01); *G07C 5/0816* (2013.01)

(58) Field of Classification Search
CPC ..... G06F 11/001; G06F 11/004; G06F 11/008
See application file for complete search history.

(56) References Cited

U.S. PATENT DOCUMENTS

| 10,452,432 | B2 * | 10/2019 | Lim ...................... G06F 3/0659 |
|---|---|---|---|
| 2017/0286161 | A1 * | 10/2017 | Lim ........................... H04J 3/06 |
| 2018/0077042 | A1 * | 3/2018 | Kim .................... H04L 12/4625 |
| 2018/0101501 | A1 * | 4/2018 | Fischer ................ G05B 19/042 |
| 2018/0113702 | A1 * | 4/2018 | Elizalde .................... G06F 8/65 |
| 2018/0124244 | A1 * | 5/2018 | Lee ........................ H04W 48/14 |
| 2019/0367042 | A1 * | 12/2019 | Cho .................... G06F 11/3668 |
| 2020/0068405 | A1 * | 2/2020 | Stählin .................... H04W 4/40 |
| 2020/0143041 | A1 * | 5/2020 | Jung ........................ G06F 21/53 |
| 2020/0272512 | A1 * | 8/2020 | Rohleder .............. G06F 9/4881 |
| 2021/0208909 | A1 * | 7/2021 | Lampka ............... G06F 9/45504 |
| 2022/0182259 | A1 * | 6/2022 | Park ........................ H04L 47/28 |
| 2022/0185303 | A1 * | 6/2022 | Friedberger .......... G06F 9/4887 |
| 2022/0188153 | A1 * | 6/2022 | Kang .................... G06F 9/5016 |
| 2022/0188159 | A1 * | 6/2022 | Park ...................... B60R 16/023 |
| 2022/0300445 | A1 * | 9/2022 | Sharma .................. G06F 9/441 |

FOREIGN PATENT DOCUMENTS

| JP | 2011-165185 A | 8/2011 |
|---|---|---|
| KR | 2012-0060435 A | 6/2012 |
| KR | 2017-0111630 A | 10/2017 |

* cited by examiner

*Primary Examiner* — Kamini B Patel
(74) *Attorney, Agent, or Firm* — MORGAN, LEWIS & BOCKIUS LLP

(57) ABSTRACT

An apparatus of optimizing an alarm offset for an AUTomotive Open System Architecture (AUTOSAR) operating system, may include a start module configured to input an offset value of a predetermined offset table to an offset variable value for each alarm information related to an alarm setting test file; and an execution module configured to execute the alarm setting test file based on the input offset value and output an execution result for optimizing the alarm offset.

18 Claims, 5 Drawing Sheets

FIG. 3

| ALARM INFORMATION/INDEX | ALARM NAME | ALARM A | ALARM B | ALARM C | ALARM D | ALARM E | ALARM F | NUMBER OF TIMES OF ERROR/HOOK (REFERENCE VALUE:0) | CPU LOAD (REFERENCE VALUE:40%) | CPU PEAK LOAD (REFERENCE VALUE:60%) | SATISFACTION OF REFERENCE VALUE |
|---|---|---|---|---|---|---|---|---|---|---|---|
| | PERIOD | 5ms | 5ms | 10ms | 10ms | 20ms | 100ms | | | | |
| | WHETHER OFFSET IS CHANGED | TRUE | TRUE | TRUE | FALSE (2) | FALSE (3) | TRUE | | | | |
| 1 | | 0 | 0 | 0 | 2 | 3 | 0 | | | | |
| 2 | | 0 | 0 | 0 | 2 | 3 | 1 | | | | |
| ... | | | | | | | | | | | |
| 100 | | 1 | 2 | 7 | 2 | 3 | 0 | | | | |
| 101 | | 1 | 2 | 7 | 2 | 3 | 1 | | | | |
| ... | | | | | | | | | | | |
| 500 | | 4 | 3 | 4 | 2 | 3 | 32 | | | | |
| ... | | | | | | | | | | | |
| 1000 | | 4 (Max) | 4 (Max) | 8 (Max) | 2 (FIXED) | 3 (FIXED) | 40 (Max) | | | | |

FIG. 4

| ALARM INFORMATION/INDEX | ALARM NAME | | ALARM A | ALARM B | ALARM C | ALARM D | ALARM E | ALARM F | NUMBER OF TIMES OF ERRORHOOK (REFERENCE VALUE: 0) | CPU LOAD (REFERENCE VALUE: 40%) | CPU PEAK POAD (REFERENCE VALUE: 60%) | SATISFACTION OF REFERENCE VALUE |
|---|---|---|---|---|---|---|---|---|---|---|---|---|
| | PERIOD | | 5ms | 5ms | 10ms | 10ms | 20ms | 100ms | | | | |
| | WHETHER OFFSET IS CHANGED | | TRUE | TRUE | TRUE | FALSE (2) | FALSE (3) | TRUE | | | | |
| 1 | | | 0 | 0 | 0 | 2 | 3 | 0 | 56 (NG) | 60% (NG) | 85.4% (NG) | FAIL |
| 2 | | | 0 | 0 | 0 | 2 | 3 | 1 | 48 (NG) | 55% (NG) | 81% (NG) | FAIL |
| ... | | | | | | | | | | | | |
| 100 | | | 1 | 2 | 7 | 2 | 3 | 0 | 0 | 15% | 59% | PASS |
| 101 | | | 1 | 2 | 7 | 2 | 3 | 1 | 0 | 18% | 55% | PASS |
| ... | | | | | | | | | | | | |
| 500 | | | 4 | 3 | 4 | 2 | 3 | 32 | 0 | 60% (NG) | 70% (NG) | FAIL |
| ... | | | | | | | | | | | | |
| 1000 | | | 4 (Max) | 4 (Max) | 8 (Max) | 2 (FIXED) | 3 (FIXED) | 40 (Max) | 48 (NG) | 70% (NG) | 70% (NG) | FAIL |

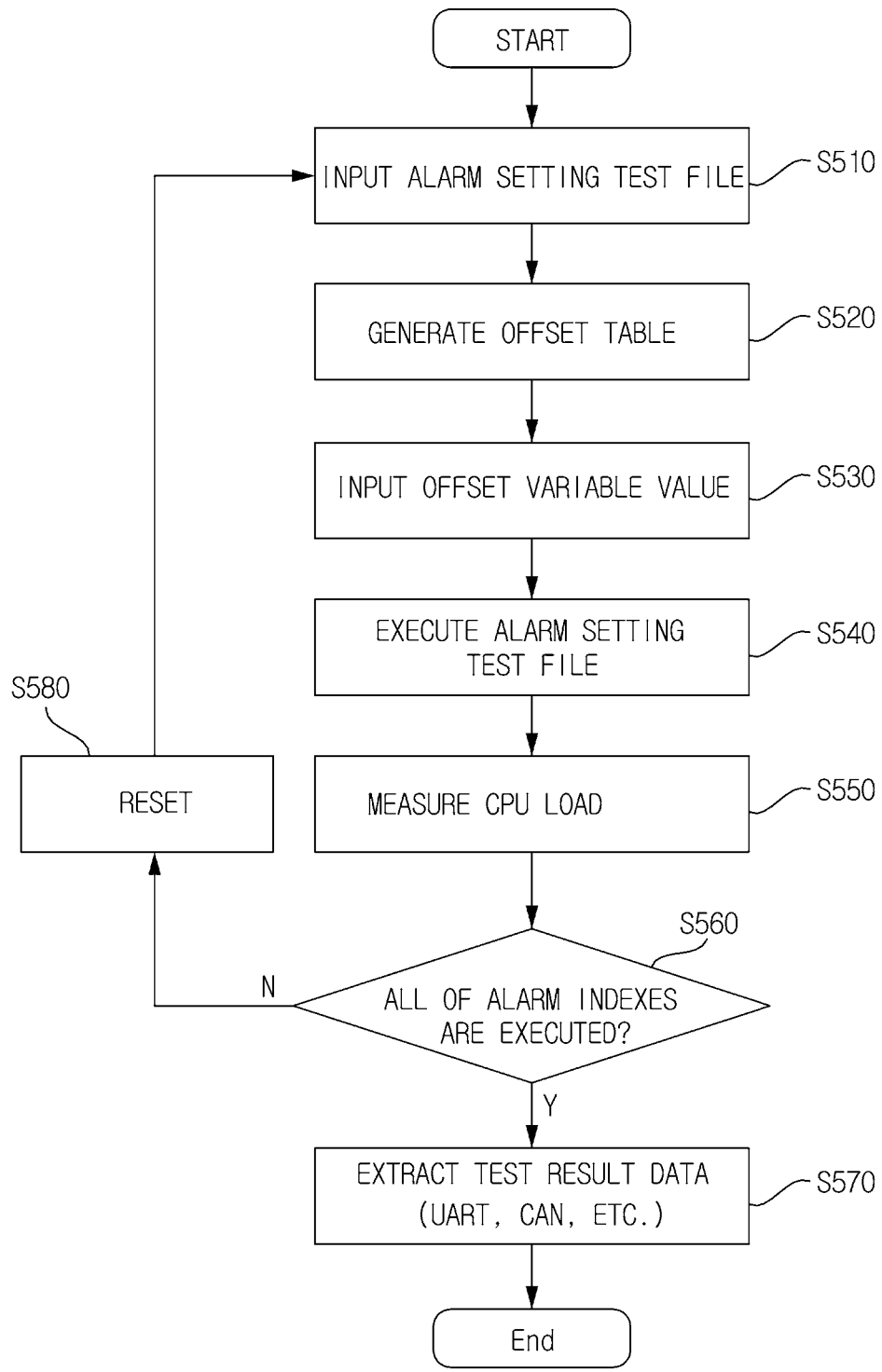

ALARM OFFSET OPTIMIZATION APPARATUS OF AUTOSAR OPERATING SYSTEM

CROSS-REFERENCE TO RELATED APPLICATIONS

The present application claims priority to Korean Patent Application No. 10-2019-0162688 filed on Dec. 9, 2019, the entire contents of which is incorporated herein for all purposes by this reference.

BACKGROUND OF THE INVENTION

Field of the Invention

The present invention relates to an alarm offset optimization apparatus of an AUTomotive Open System Architecture (AUTOSAR) operating system.

Description of Related Art

As the number of electronic devices used in vehicles increases, the demand for standardization of software used for the electronic devices also increases. Accordingly, to increase reusability of the module and improve compatibility of a component for each vehicle, an embedded software open platform based on AUTomotive Open System Architecture (AUTOSAR) is being developed.

The AUTOSAR platform is an operation system in the field of vehicle electronics, and has a mechanism for controlling an operation of a vehicle control unit.

The AUTOSAR platform is gradually used in more and more places, and the usable functions thereof become various. The AUTOSAR platform has been expanded and applied to the global vehicle markets.

In the case of various vehicle control units, the functions are being combined with each other. That is, various vehicle control functions are performed through various vehicle control units, but recently, this is changed so that various vehicle control functions are usable in one vehicle control unit. For example, a vehicle control unit in the related art includes an Integrated Body Control Unit (IBU), an Integrated Central Unit (ICU), and the like, and even the integrated type of control unit is being integrated into a Communication Control Unit (CCU).

Accordingly, the number of functions used in the single vehicle control unit is gradually increasing, and the software resource is insufficient. When the software resource is insufficient, the vehicle control unit may be overloaded. Furthermore, a reset or a phenomenon in which a task that may be actually performed is delayed or missed may also occur. This is not only a problem of the vehicle control unit, but also causes fatal vehicle defects.

To solve the problem, the current AUTOSAR platform provides an alarm offset function under an operating system environment.

The alarm offset prevents several tasks from being executed at once by distributing alarm positions for notifying the task execution time as much as possible, preventing a lot of resources from being allocated. Through this, there is an effect that various tasks are executed without a problem.

However, no method of optimizing the alarm offset is defined in any specification.

A developer of general Application SoftWare (ASW) sets an alarm offset based on information accumulated through many experiences or a developer of Basic SoftWare (BSW) sets an alarm offset based on information under a general situation.

An optimization value of the alarm offset may be different depending on a specific vehicle control unit or a specific MCU, so that when the optimization of the alarm offset is performed for each specification of the vehicle control unit, a resource insufficient phenomenon under the AUTOSAR operating system may be solved.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

The various aspects of the present invention are directed to providing an alarm offset optimization apparatus configured for an AUTomotive Open System Architecture (AUTOSAR) operating system, which optimizes an alarm offset for each specification of a vehicle control unit, so that it is possible to rapidly measure a task execution time under a real run time environment, compared to a measurement of a task execution time one by one.

Various aspects of the present invention are directed to providing an apparatus of optimizing an alarm offset for an AUTomotive Open System Architecture (AUTOSAR) operating system, the apparatus including: a start module configured to input an offset value of a predetermined offset table to an offset variable value for each alarm information related to an alarm setting test file; and an execution module configured to execute the alarm setting test file based on the input offset value and output an execution result for optimizing the alarm offset.

The offset table may include a plurality of alarm information including the number of alarms, an alarm name, and an alarm period, and index information connected with each alarm information through an offset value.

The start module may input the offset value according to the index information as the offset variable value.

The execution module may execute the alarm setting test file in an order of the index information.

The apparatus may further include an offset table storing unit which stores the offset table.

The apparatus may further include a load measuring module which is configured to measure a CPU load according to an execution of the alarm setting test file.

The apparatus may further include a reset module which requests a reset from the execution module so that the alarm setting test file is executed according to another index information when the execution of the alarm setting test file according to the index information is completed.

When the execution of the alarm setting test file according to last index information is completed, the execution module may transmit an execution result to the outside by a pre-prepared communication method.

The execution result may include a minimum CPU load, a maximum CPU load, and the number of times of a call of the ErrorHook.

The execution module may compare the minimum CPU load, the maximum CPU load, and the number of times of the call of the ErrorHook with predetermined reference values and determines whether the minimum CPU load, the maximum CPU load, and the number of times of the call of the ErrorHook satisfies the predetermined reference values.

The apparatus may further include a producing tool which is configured to receive an input of alarm information connected with a task of the AUTOSAR operating system and produces an alarm setting file by use of the alarm information.

The apparatus may further include a correcting unit which is configured to correct an offset value of the alarm setting file to an offset variable value and generates the alarm setting test file.

The alarm offset optimization apparatus for the AUTOSAR operating system according to the exemplary embodiment of the present invention optimizes an alarm offset for each specification of a vehicle control unit, not by a simple experience, so that it is possible to rapidly measure a task execution time under an actual run time environment, compared to the measurement of a task execution time one by one.

It is possible to solve a resource insufficient phenomenon in the AUTOSAR operating system.

The foregoing summary is illustrative only and is not intended to be in any way limiting. In addition to the illustrative aspects, embodiments, and features described above, further aspects, embodiments, and features will become apparent by reference to the drawings and the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a diagram illustrating an offset table.

FIG. 4 is a diagram illustrating an alarm offset optimization value according to an offset table.

FIG. 5 is a flowchart illustrating an alarm offset optimization method for an AUTOSAR operating system according to various exemplary embodiments of the present invention.

Figure 1:
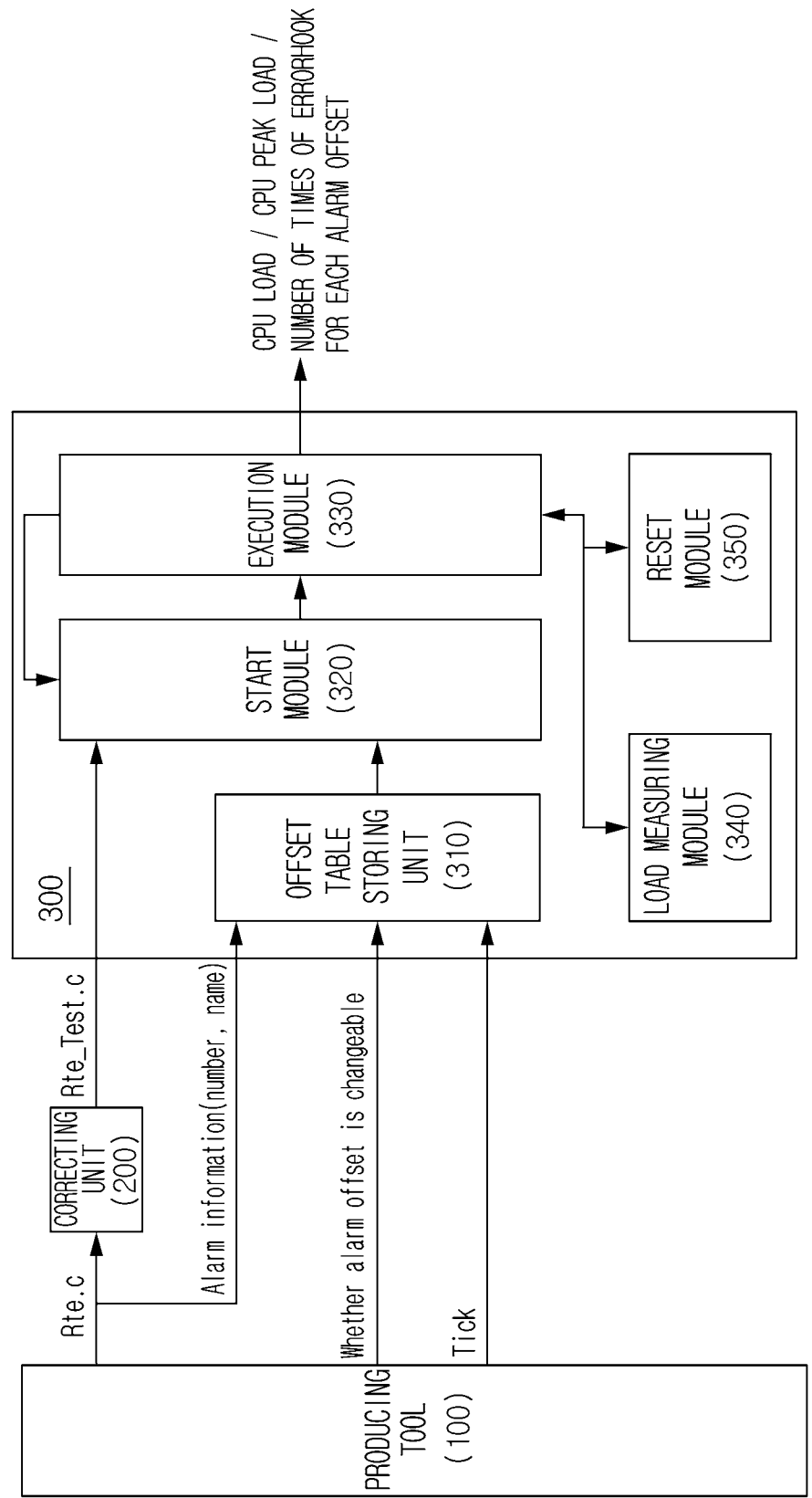
FIG. 1 is a block diagram illustrating an alarm offset optimization apparatus configured for an AUTomotive Open System Architecture (AUTOSAR) operating system according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

FIG. 1 is a block diagram illustrating an alarm offset optimization apparatus configured for an AUTomotive Open System Architecture (AUTOSAR) operating system according to various exemplary embodiments of the present invention.

Referring to FIG. 1, an AUTOSAR operating system 10 according to various exemplary embodiments of the present invention may include a producing tool 100, a correcting unit 200, and an alarm offset optimizing unit 300.

The producing tool 100 may receive an input of SoftWare Program (SWP) information and APP information (user information) according to a need of a user. Herein, the SWP information may include a tick value, the number of SWP alarms, a period of each SWP alarm, whether an offset of each SWP alarm is changed, and a fixed offset value of an SWP alarm having a fixed offset. Herein, the tick value is a basic unit of an alarm.

The APP information may include the number of ASW alarm, each ASW alarm period, whether an offset of each ASW alarm is changed, a fixed offset value of an ASW alarm having a fixed offset, a minimum/maximum CPU load, and the number of times of a minimum ErrorHook call. The ErrorHook refers to a hook routine provided from the AUTOSAR operating system so that the user is configured for selecting whether to use a service having an error.

The producing tool 100 may generate combination information by combining the SWP information and the APP information according to a need of the user. Herein, the combination information may include the number of total alarms obtained by summing the number of SWP alarms and the number of ASW alarms, an offset possible value for each alarm, fixed or changeable information for an offset of each alarm, and a reference value used for determining pass or fail for a result value.

The offset possible value (maximum offset value) for each alarm may be set by dividing a maximum period of a task by a tick value. In the exemplary embodiment of the present invention, when the tick value is 2.5 ms and an alarm period is 10 ms, a maximum offset value may be set to 4.

The fixed or changeable information for an offset of each alarm may fix an alarm that needs to have a fixed offset and change an alarm that may have a changed offset.

The reference value used for determining pass or fail for the result value may be determined through a minimum CPU load that is the APP information, the minimum number of times of the ErrorHook call, and the like.

The producing tool 100 may generate an alarm setting file Rte.c for setting an alarm by use of the combination information. Furthermore, the producing tool 100 may input the total number of alarms, a name of each alarm, whether an offset of each alarm is changeable, and the tick value to an offset table 110. Through this, the offset table may be configured.

In the meantime, each alarm information related to the combination information is mapped with the tasks. When a function for the alarm information related to the alarm setting file Rte.c is executed, an alarm rings as the counter increases, and the task connected with the alarm is executed. The alarm offset is set to prevent the alarms from ringing at the same time. That is, the alarm offset prevents the alarms from ringing at the same time, preventing the CPU load from increasing.

The correcting unit 200 may generate an alarm setting test file Rte_Test.c by correcting the alarm setting file Rte.c. The correcting unit 200 may variabalize the offset value of each alarm information SetRelAlarm included in the alarm setting file Rte.c. The correcting unit 200 may generate an offset variable setting function SchM_Init for variabalizing the offset value of the alarm setting file Rte.c. The offset value of the offset table may be sequentially input to the offset variable setting function SchM_Init.

In the exemplary embodiment of the present invention, the maximum offset variable value may be set with a value obtained by dividing a maximum period of the task by the tick value. The process of variabalizing the offset value will be described below with reference to FIG. 2.

The alarm offset optimizing unit 300 may include an offset table storing unit 310, a start module 320, an execution module 330, a load measuring module 340, and a reset module 350.

The offset table storing unit 310 may store index information, alarm information (the number, name, and period), whether the alarm offset is changeable, and the offset table formed of the offset values.

The start module 320 may input the offset value to the offset variable setting function SchM_Init of the alarm setting test file Rte_Test.c in an index order of the offset table.

The execution module 330 may determine the minimum CPU load, the maximum CPU load, and the number of calls of the ErrorHook for each offset of the alarm information by executing the alarm setting test file Rte_Test.c to which the offset value is input.

The load measuring module 340 may measure a CPU load according to the execution of the execution module 330 and transmit a measurement value to the execution module 330.

The reset module 350 may reset the execution of the alarm setting test file Rte_Test.C. That is, the reset module 350 may request the reset from the execution module 330 so that the alarm setting test file Rte_Test.c is executed according to another index of the offset table.

When the execution of the alarm setting test file Rte_Test.c is completed according to the last index of the offset table, the execution module 330 may store the execution result in the offset table or output the execution result in a separate communication scheme (Uart, CAN). The execution result of the execution module 300 may be output in a form of an Excel or a txt file, and may be utilized as information for optimizing an alarm offset.

Figure 2:
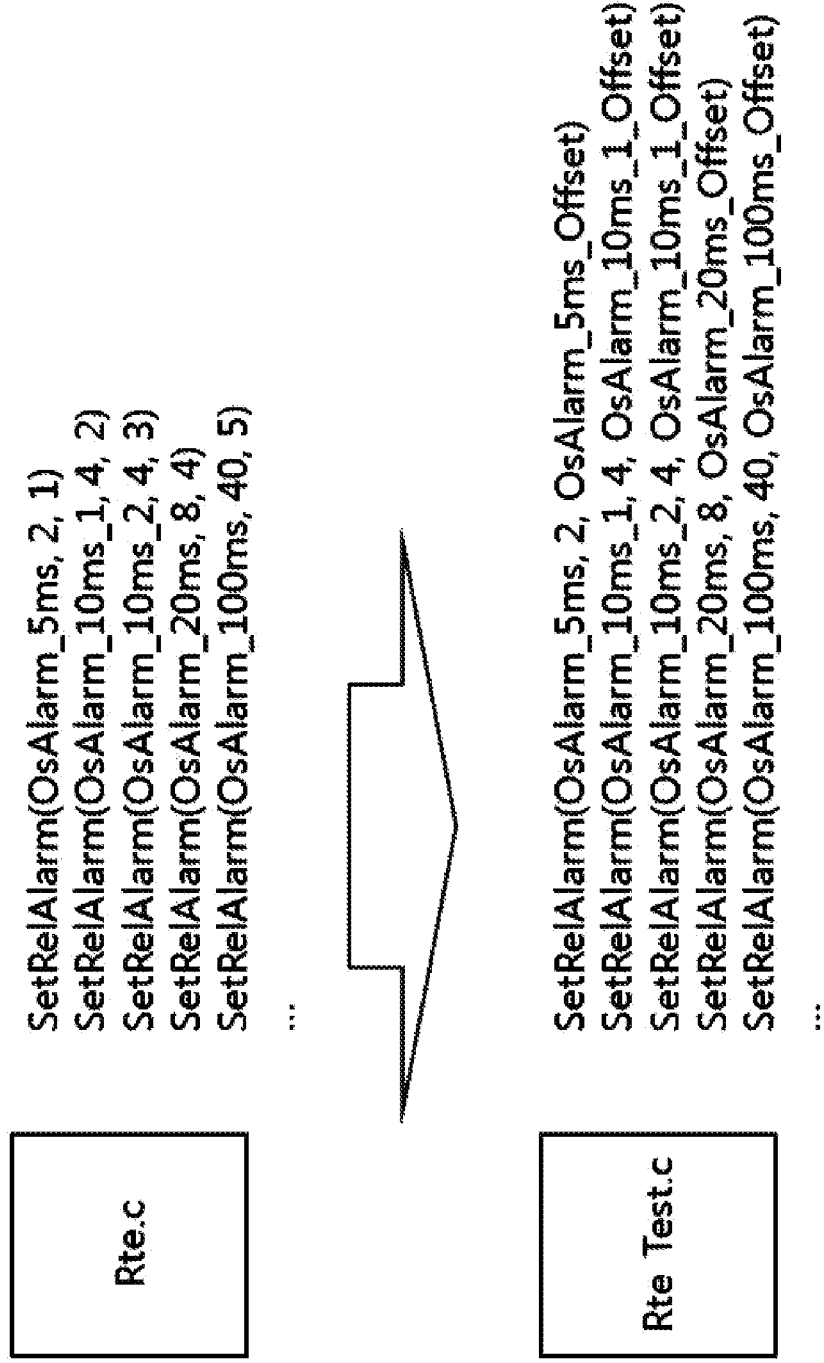
FIG. 2 is a diagram illustrating a process of variabalizing an alarm offset variable value.

FIG. 2 is a diagram illustrating a process of variabalizing an alarm offset value.

Referring to FIG. 2, it may be seen that the alarm offset value of the alarm setting file Rte.c is set to the offset variable value in the alarm setting test file Rte_Test.c.

Each alarm information SetRelAlarm) of the alarm setting file Rte.c may include the kind, a period, and an offset value of the alarm.

In the exemplary embodiment of the present invention, any one alarm information SetRelAlarm may have the kind of alarm of OsAlarm_5 ms, a period of 2, and an offset value of 1. Herein, the period of the alarm may be 5 ms obtained by multiplying the period of 2 and the tick value of 2.5 ms.

Another alarm information SetRelAlarm may have the kind of alarm of OsAlarm_10 ms_1, a period of 4, and an offset value of 2. Herein, the period of the alarm may be 10 ms obtained by multiplying the period of 4 and the tick value of 2.5 ms.

Another alarm information SetRelAlarm may have the kind of alarm of OsAlarm_10 ms_2, a period of 4, and an offset value of 3. Herein, the period of the alarm may be 10 ms obtained by multiplying the period of 4 and the tick value of 2.5 ms.

Another alarm information SetRelAlarm may have the kind of alarm of OsAlarm_20 ms, a period of 8, and an offset value of 4. Herein, the period of the alarm may be 10 ms obtained by multiplying the period of 8 and the tick value of 2.5 ms.

Another alarm information SetRelAlarm may have the kind of alarm of OsAlarm 100 ms, a period of 40, and an offset value of 5. Herein, the period of the alarm may be 100 ms obtained by multiplying the period of 40 and the tick value of 2.5 ms.

The alarm setting file Rte.c including the alarm information may be corrected to an alarm setting test file Rte_Test.c by the correcting unit 200.

In the exemplary embodiment of the present invention, any one alarm information SetRelAlarm of the alarm setting test file Rte_Test.c may have the kind of alarm of OsAlarm_5 ms, a period of 2, and an offset variable value of OsAlarm_5 ms_Offset.

Another alarm information SetRelAlarm may have the kind of alarm of OsAlarm_10 ms_1, a period of 4, and an offset variable value of OsAlarm_10 ms_1_Offset.

Another alarm information SetRelAlarm may have the kind of alarm of OsAlarm_10 ms2, a period of 4, and an offset variable value of OsAlarm_10 ms_2_Offset.

Another alarm information SetRelAlarm may have the kind of alarm of OsAlarm_20 ms, a period of 8, and an offset variable value of OsAlarm_2 ms_Offset.

Another alarm information SetRelAlarm may have the kind of alarm of OsAlarm_100 ms, a period of 40, and an offset variable value of OsAlarm_100 ms_Offset.

FIG. 3 is a diagram illustrating an offset table.

Referring to FIG. 3, the offset table may include alarm information (an alarm name, an alarm period, whether an offset is changed, an offset variable value, and index information).

In the exemplary embodiment of the present invention, when the alarm name is Alarm A, Alarm A may have the period of 5 ms, whether an offset is changeable, and offset variable values 0, 0, 1, 1, 4, and 4(MAX) in the order of the indexes of 1, 2, 100, 101, 500, and 100. The detailed description for other alarm information will be omitted.

FIG. 4 is a diagram illustrating an alarm offset optimization value according to an offset table.

Referring to FIG. 4, the offset table may include the execution result of the execution module 330. That is, the offset table may further include the number of times of the call of the ErrorHook (reference value: 0), the minimum CPU load (reference value: 40%), the maximum CPU load (reference value: 60%), and whether the reference value is satisfied.

In the exemplary embodiment of the present invention, when the alarm name is Alarm A, the number of times of the call of the ErrorHook may be represented with 56(NG), 49(NG), 0, 0, 0, and 48(NG) in the order of index 1, 2, 100, 101, 500, and 100. Herein, NG means not good.

In the case of Alarm A, the minimum CPU load may be represented with 60% (NG), 55% (NG), 15%, 18%, 60% (NG), 70% (NG) in the order of index 1, 2, 100, 101, 500, and 100.

In the case of Alarm A, the maximum CPU load may be represented with 85% (NG), 81% (NG), 59%, 55%, 70% (NG), 70% (NG) in the order of index 1, 2, 100, 101, 500, and 100.

In the case of Alarm A, whether the reference value is satisfied may be represented with fail, fail, pass, pass, fail, and fail in the order of index 1, 2, 100, 101, 500, and 100. The detailed description for other alarm information will be omitted.

FIG. 5 is a flowchart illustrating an alarm offset optimization method for an AUTOSAR operating system according to various exemplary embodiments of the present invention.

Referring to FIG. 5, the alarm offset optimization method for the AUTOSAR operating system according to the exemplary embodiment of the present invention may include an alarm setting test file inputting operation S510, an offset table generating operation S520, an offset variable value setting operation S530, an alarm setting test file executing operation S540, a CPU load measuring operation S550, an index determining operation S560, a reset operation S570, and an execution result outputting operation S580.

In the alarm setting test file inputting operation S510, an alarm setting test file for setting an alarm may be input. The alarm setting test file may include an offset variable setting function SchM_Init for variabalizing an offset value of each alarm information to an offset variable value.

In the offset table generating operation S520, an offset table formed of index information, alarm information (the number, name, and period), whether an alarm offset is changeable, and an offset value may be generated. The offset table may be stored in the offset table storing unit 310.

In the offset variable value inputting operation S530, an offset value may be input to the offset variable setting function SchM_Init in the order of the index of the offset table.

In the alarm setting test file executing operation S540, the alarm setting test file Rte_Test.c, to which the offset value is input, is executed in the order of the index of the offset table, so that a minimum CPU load, a maximum CPU load, and the number of times of the call of the ErrorHook according to the offset of the alarm information may be determined.

In the CPU load measuring operation S550, the CPU load according to the execution of the alarm setting test file Rte_Test.c may be measured.

In the index determining operation S560, when the minimum CPU load, the maximum CPU load, and the number of times of the call of the ErrorHook according to the offset of the alarm information are determined, it is determined whether the index is the last index of the offset table.

In the reset operation S580, the execution of the alarm setting test file Rte_Test.c is reset until the minimum CPU load, the maximum CPU load, and the number of times of the call of the ErrorHook for the alarm information according to the last index of the offset table are determined.

In the execution result outputting operation S570, the minimum CPU load, the maximum CPU load, and the number of times of the call of the ErrorHook that are the execution results for the entire alarm information are output. The minimum CPU load, the maximum CPU load, and the number of times of the call of the ErrorHook may be stored in the offset table, or may be transmitted to the outside by a communication method, such as UART and CAN and be used for optimizing an alarm offset.

Although the exemplary embodiment of the present invention has been described for illustrative purposes, those skilled in the art will appreciate that various modifications, additions and substitutions are possible, without departing from the scope and spirit of the present invention. Therefore, the exemplary embodiments included in various exemplary embodiments of the present invention and the accompanying drawings are not intended to limit the technical spirit of the present invention, but are intended to illustrate the scope of the technical idea of the present invention, and the scope of the present invention is not limited by the exemplary embodiment and the accompanying drawings.

The steps and/or operations according to various exemplary embodiments of the present invention may occur in different orders, or in parallel, or simultaneously in different exemplary embodiments for different epochs and the like as may be appreciated by those skilled in the art.

Depending on the exemplary embodiment of the present invention, a portion or the entirety of the steps and/or operations may be implemented or performed by use of commands stored in one or more non-temporary computer-readable media, a program, an interactive data structure, and one or more processors driving a client and/or a server. One or more non-temporary computer-readable media are hardware. Furthermore, the function of "module" discussed in the present specification may be implemented by hardware.

Meanwhile, the exemplary embodiments according to various exemplary embodiments of the present invention may be implemented in a form of program instructions that may be executed by computers, and may be recorded in computer readable media. The computer readable media may include program instructions, a data file, a data structure, or a combination thereof. By way of example, and not limitation, computer readable media may include computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which can accessed by computer. Communication media typically embodies computer readable instructions, data structures, program modules or other data in a modulated data signal such as a planet carrier wave or other transport mechanism and includes any information delivery media. The term "modulated data signal" means a signal that has one or more of its characteristics set or changed to encode information in the signal. By way of example, and not limitation, communication media includes wired media such as a wired network or direct-wired connection, and wireless media such as acoustic, RF, infrared and other wireless media. Combinations of any of the above may also be included within the scope of computer readable media.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of optimizing an alarm offset for an AUTomotive Open System Architecture (AUTOSAR) operating system, the apparatus comprising:
a processor configured to input an offset value of a predetermined offset table to an offset variable value for each alarm information related to an alarm setting test file; and
the processor configured to execute the alarm setting test file based on the input offset value and to output an execution result for optimizing the alarm offset,
wherein the execution result includes a minimum CPU load, a maximum CPU load, and a number of times of a call of ErrorHook.

2. The apparatus of claim 1, wherein the offset table includes a plurality of alarm information including a number of alarms, an alarm name, and an alarm period, and index information connected with each alarm information through an offset value.

3. The apparatus of claim 2, wherein the start module is configured to input the offset value according to the index information as the offset variable value.

4. The apparatus of claim 2, wherein the execution module is configured to execute the alarm setting test file in an order of the index information.

5. The apparatus of claim 1, further including:
an offset table storing unit which is configured to store the offset table.

6. The apparatus of claim 4, further including:
a load measuring module which is configured to measure a CPU load according to an execution of the alarm setting test file.

7. The apparatus of claim 4, further including:
a reset module which requests a reset from the execution module so that the alarm setting test file is executed according to another index information when the execution of the alarm setting test file according to the index information is completed.

8. The apparatus of claim 4, wherein when the execution of the alarm setting test file according to last index information is completed, the execution module is configured to transmit an execution result to an outside thereof by a pre-prepared communication method.

9. The apparatus of claim 1, wherein the execution module is configured to compare the minimum CPU load, the maximum CPU load, and the number of times of the call of the ErrorHook with predetermined reference values and is configured to determine whether the minimum CPU load, the maximum CPU load, and the number of times of the call of the ErrorHook satisfies the predetermined reference values.

10. The apparatus of claim 1, further including:
a producing tool which is configured to receive an input of alarm information connected with a task of the AUTOSAR operating system and produces an alarm setting file by use of the alarm information.

11. The apparatus of claim 10, further including:
a correcting unit which is configured to correct an offset value of the alarm setting file to an offset variable value and generates the alarm setting test file.

12. A method of optimizing an alarm offset for an AUTomotive Open System Architecture (AUTOSAR) operating system, the method comprising:
inputting an offset value of a predetermined offset table to an offset variable value for each alarm information related to an alarm setting test file; and
executing the alarm setting test file based on the input offset value and outputting an execution result for optimizing the alarm offset; and
measuring a CPU load according to an execution of the alarm setting test file.

13. The method of claim 12, wherein the offset table includes a plurality of alarm information including a number of alarms, an alarm name, and an alarm period, and index information connected with each alarm information through an offset value.

14. The method of claim 13, wherein the offset value is input according to the index information as the offset variable value.

15. The method of claim 13, wherein the alarm setting test file is executed in an order of the index information.

16. The method of claim 13, further including:
executing the alarm setting test file according to another index information when the execution of the alarm setting test file according to the index information is completed.

17. The method of claim 12,
wherein the execution result includes a minimum CPU load, a maximum CPU load, and a number of times of a call of ErrorHook, and
wherein the method further includes:
comparing the minimum CPU load, the maximum CPU load, and the number of times of the call of the ErrorHook with predetermined reference values; and
determining whether the minimum CPU load, the maximum CPU load, and the number of times of the call of the ErrorHook satisfies the predetermined reference values.

18. The method of claim 17, further including: resetting the execution of the alarm setting test file until the minimum CPU load, the maximum CPU load, and the number of times of the call of the ErrorHook for the alarm information according to a last index of the offset table are determined.

* * * * *